Nov. 13, 1934.  G. C. REEVES  1,980,437
POWER TRANSMISSION DEVICE
Filed May 20, 1933
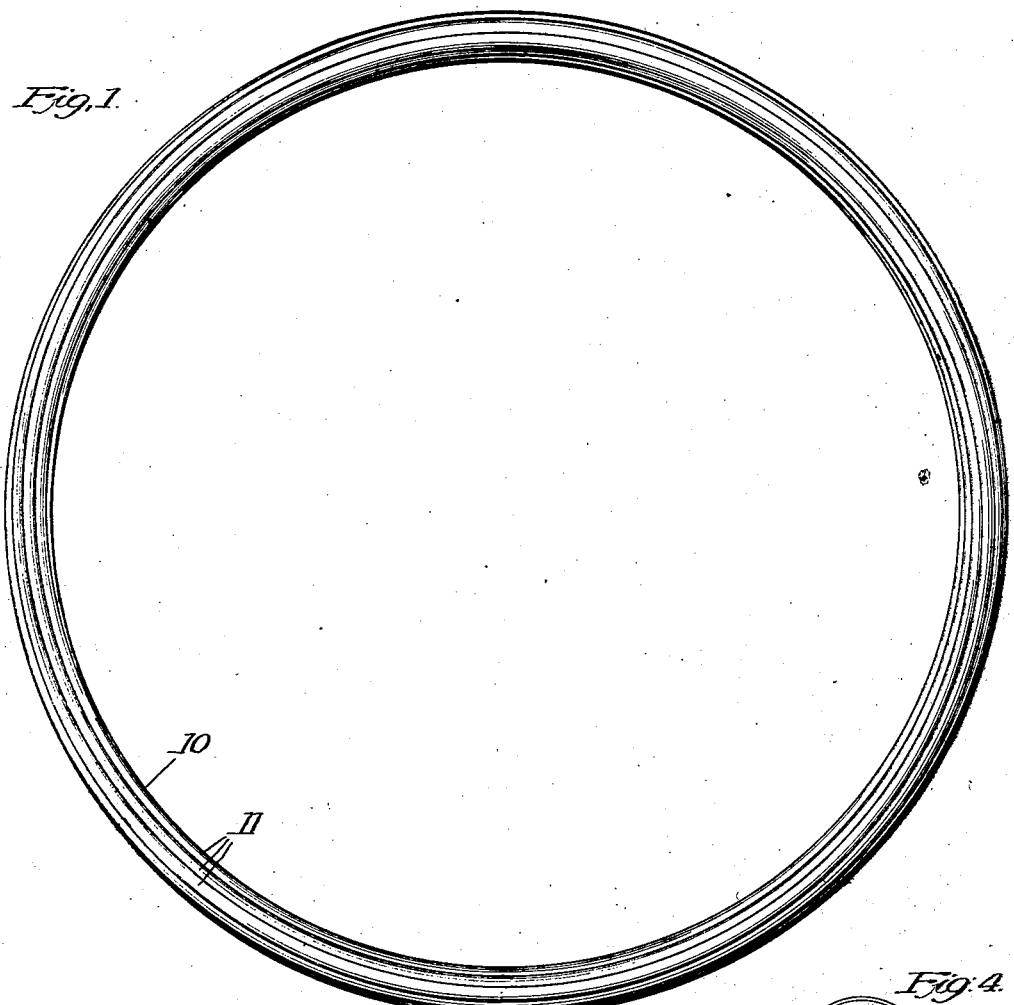
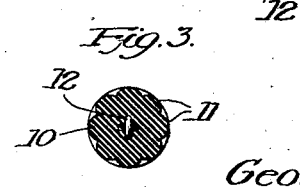
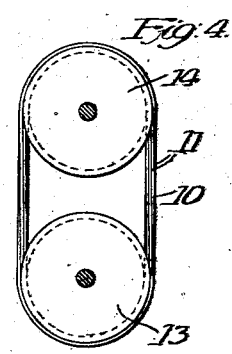
Inventor:
George C. Reeves Patented Nov. 13, 1934

1,980,437

UNITED STATES PATENT OFFICE 1,980,437

POWER TRANSMISSION DEVICE

George C. Reeves, Chicago, Ill., assignor to Dryden Rubber Company, Chicago, Ill., a corporation of Illinois Application May 20, 1933, Serial No. 672,008

8 Claims. (Cl. 74—238)

My invention relates to a power transmission device, and is particularly adapted as a belt for use in connection with the operation of electrically operated mechanical refrigerators, fan belts for internal combustion engines, and the like, where belts of V type are commonly used.

The principal object of my invention is the provision of a power transmitting device which is adapted to turn radially as it travels over the pulleys, thereby preventing a constant area of stress being set up in the body of the belt which ultimately cracks, wears, and shortens the life of the average power transmitting device now in use.

Another and further object of my invention is the provision of a power transmitting device preferably formed entirely of rubber of the ordinary commercial type, having a non-elastic member or members preferably in the form of a metallic reinforcing member embedded therein and vulcanized therearound, with ribs on the outer surface of the belt to give it a rotary motion as the belt travels.

Another and further object of my invention is the provision of a belt in which there is a constant distribution of the belt stresses rather than a repetition of these stresses as in the belts of the present type, and also the provision of a belt in which all surfaces have a constantly changing contact with the pulleys and consequent increased wear and length of life.

Another object of my invention is the provision of a power transmitting device having a metallic reinforcing member in the form of a chain embedded therein, and which has the rubber pressed around and into the links making up the chain so that all of the interstices formed by the links of the chain are filled with rubber in a plastic state, the belt being afterwards molded so that the rubber is solidly formed except for such spaces therein as are actually occupied by the links making up the chain. My invention is not limited to the use of an embedded metallic member to prevent undue distention, which result can also be secured through similar introduction of one or more plies of woven fabric or one or more strands of cord.

In the manufacture of the usual type of fan belts, particularly of the V type, which run continuously in one direction, the belt is constantly flexed as it passes around the pulleys, and this flexure in one direction breaks and cracks the rubber or fabric of which the belt is made, to such an extent that a belt is comparatively short lived and frequently must be replaced with a new belt. To overcome the setting up of stress in any particular longitudinal area of the belt, I have provided a belt made of solid rubber, with an inelastic reinforcing member embedded therein, the belt as it travels rotating so that there is a constant change in areas of the belt which are being subjected to stress and pulley contact. For instance, as the usual belt travels around the pulley, the inner side is subjected to compression strains, while upon the outer side of the belt a pulling force is exerted. After the belt travels around the pulley and reaches a straight line there is a flexure back to the normal position.

In my improved device, as the belt is rotated these stresses are constantly distributed and there is no area of the belt which is subjected to the same kind of stresses at all times. For instance, with one revolution of the belt, one section will be subjected to the compression strains and when this area reaches the opposite pulley it will have moved a slight distance toward the side of the belt and this particular area ultimately will be on the outer side of the belt so that all portions of the belt are ultimately subjected to the compression and stretching stresses which results in longer life to the belt and more satisfaction in service during its operation.

These and other objects will be more fully and better understood by reference to the accompanying sheet of drawings, in which—

Figure 1 is an elevational view of the belt embodying my invention;

Figure 2 is an elevational view of a longitudinal section of the belt;

Figure 3 is a transverse sectional view of the belt illustrated in Figures 1 and 2;

Figure 4 is an elevational view showing the belt in service over a pair of pulleys; and Figure 5 is a cross sectional view of a rubber belt illustrating a modified form of ribs on the outer periphery of the belt.

Referring now specifically to the drawing, and in which like reference characters refer to like parts throughout, a belt 10 is illustrated having a plurality of ribs 11, 11 thereon, which said ribs are slightly rounded in contour and extend circumferentially around the belt 10 slightly in a spiral direction, this spiral direction preferably being quite slight, in the belt of the form illustrated being sufficient to give the belt one rotation in about ten times of its travel around the pulleys. The angle of these ribs, however, is immaterial, although I prefer to have them travel on a fairly long spiral so as not to give the belt a rapid rotation during its movement, but a sufficient radial movement so that stresses cannot be set up in any portion of the belt during its operation.

Embedded in the belt 10 is a metallic member in the form of a chain 12, having a plurality of links of the usual form, and around which the body of the belt 10, made up of the usual commercial form of rubber, is pressed while the rubber is in a plastic condition, in such manner that the openings between the links of the chain are completely filled with the rubber, this being accomplished preferably in a mold or the like, and the whole body vulcanized in such manner that the rubber is formed completely around the metallic member 12. In placing the metallic member 12 in the rubber, the chain is not drawn particularly taut although stretched out to a fair extent. After the rubber is vulcanized therearound there is a sufficient amount of elasticity in the rubber member so that it can be easily placed over a pair of pulleys 13 and 14 in the usual manner, with a sufficient amount of elasticity in the belt to afford sufficient friction on the surface of the pulleys 13 and 14 to cause them to rotate as power is applied to one or the other.

In Figure 5 is illustrated a belt having ribs extending circumferentially of the surface thereof in a spiral direction of the belt, the said ribs having sharp edges or surfaces which may be desirable for some kinds and classes of work, although I prefer to use the form particularly illustrated in Figures 1 and 3.

These belts are formed of endless material having the ends vulcanized together to form continuous surfaces and are generally in comparatively short lengths for use on fan belts and motor operated mechanical refrigerators and the like.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. An endless flexible power transmission device substantially round in cross section and having ribs thereon extending longitudinally of and spirally around the body of the device whereby the device is caused to rotate as it travels.

2. An endless flexible power transmission device substantially round in cross section having ribs on the outer surface thereof extending longitudinally of and spirally around the body of the device whereby the device is caused to rotate as it travels.

3. An endless belt having a rubber body having ribs extending longitudinally of and spirally around the said belt on the surface thereof, and a chain embedded in the said body member throughout its entire length.

4. An endless belt comprising a rubber body member having a plurality of ribs extending longitudinally of and spirally around the body of the belt, and a chain embedded therein, portions of the body of the belt extending into the loops formed by the chain links.

5. An endless belt comprising a rubber body member having a plurality of ribs extending longitudinally of and spirally around the body of the belt, and a chain embedded loosely in said body.

6. An endless belt comprising a rubber body member having a plurality of ribs extending longitudinally of and spirally around the body thereof, and a chain embedded loosely in said body, the rubber body member being solidly molded around the said chain.

7. An endless belt comprising, in combination, a rubber body member having a plurality of ribs extending longitudinally of and spirally around the body thereof, and a substantially inelastic reinforced member.

8. An endless belt comprising, in combination, a rubber body member having a plurality of ribs extending longitudinally of and spirally around the body thereof, and an inelastic core portion.

GEORGE C. REEVES.